Feb. 2, 1965    G. W. DORRELL ETAL    3,168,295

VARIABLE-RATIO HYDROSTATIC DRIVES

Filed June 26, 1963

Feb. 2, 1965   G. W. DORRELL ETAL   3,168,295
VARIABLE-RATIO HYDROSTATIC DRIVES
Filed June 26, 1963

United States Patent Office 3,168,295
Patented Feb. 2, 1965

3,168,295
VARIABLE-RATIO HYDROSTATIC DRIVES
George W. Dorrell, Lydiard Millicent, Swindon, and Frank G. Tunnell, Hinton Parva, Swindon, England, assignors to The Plessey Company Limited, Ilford, England, a British company
Filed June 26, 1963, Ser. No. 292,192
Claims priority, application Great Britain, June 29, 1962, 25,144
7 Claims. (Cl. 259—177)

This invention relates to variable-ratio hydrostatic drives of the kind including a positive-displacement pump of the variable-displacement kind, adapted to be power driven and constituting the input, a constant displacement hydraulic motor fed wtih the output of the positive displacement pump, and means for varying the displacement per revolution of the pump.

It is an object of the invention to provide an improved hydraulic drive of the kind specified which includes means for keeping the speed of the hydraulic motor substantially constant when the speed of the hydraulic pump varies within a predetermined range.

According to the present invention in its broadest aspect the flow of liquid through the pump and motor is arranged to pass through a metering orifice, and the pressure drop across the restriction is utilised to produce such displacement of a hydraulic piston controlling the displacement of the pump as to reduce the displacement of the pump when the pressure drop increases above, and to increase the said displacement when the pressure drop falls below, a predetermined or preset value.

The invention is mainly intended for use in rail or road vehicles or other mechanically propelled vehicles having equipment which is required to be driven by the propulsion engine at a speed which is substantially independent of the speed of the vehicle engine, and it has been developed with a special view to providing a drive for the mixing drum of a mobile concrete mixer which is required to rotate at a constant relatively low speed, for example 5 r.p.m., throughout the time the vehicle is in motion but to be driven at a faster speed in the normal direction to effect, for example, initial mixing of the components of the mixture prior to the road journey and to effect final mixing when, after arrival at the destination, water is added to the mixture. Finally rotation at a high speed in the reverse direction is generally required for the discharge of the drum.

In order that the invention may be more readily understood, an embodiment constituting the drive of a mixer drum will now be described in more detail with reference to the accompanying drawings, in which—

Figure 1:
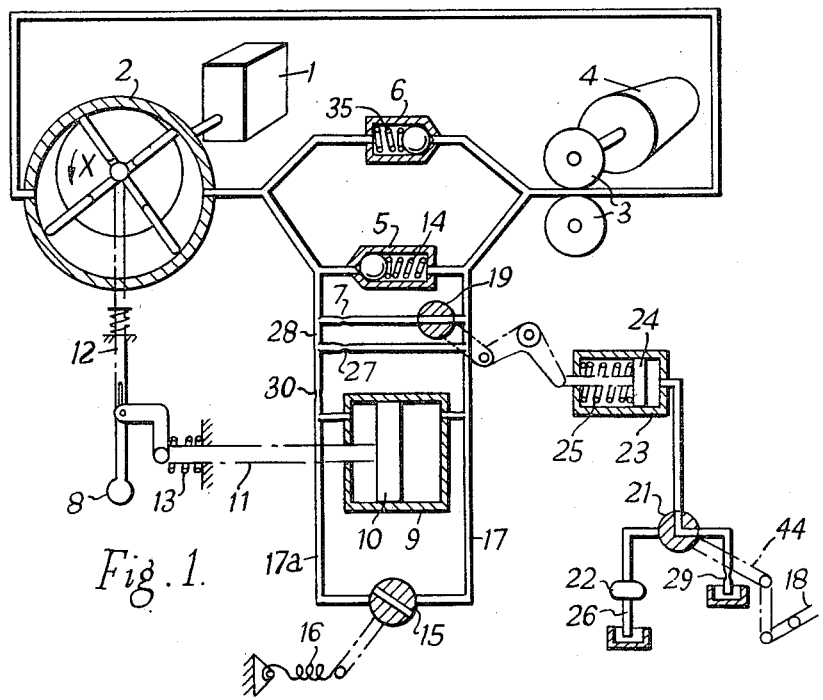
FIGURE 1 is a diagram containing symbolic representations of the various elements of the system and of their interconnection.

Referring now first to FIGURE 1, the propulsion engine 1 of a mobile concrete mixer drives a variable-displacement pump 2 in the direction indicated by the arrow X and the liquid delivered by this pump drives, via a control arrangement which will be described further below, a constant-displacement motor 3, which in turn mechanically drives the mixer drum 4. The displacement of the pump is adjustable by a member 12, and manual control means 8 and provided by which the member 12 can be moved against spring action from the illustrated position corresponding to maximum pump-delivery for "forward rotation" of the drum, to a position corresponding to maximum delivery in the reverse direction.

The above-mentioned flow-control arrangement has two main branches, one of which contains a non-return valve 6 loaded by a light holding spring 35 and arranged to provide a substantially unrestricted path of flow from the motor 3 to the pump 2 when the pump is set for "negative," delivery to rotate the drum in the reverse direction, while the valve 6 is closed and this branch therefore is inoperative during normal operation when the pump 2 is set for normal delivery. The other main branch which is thus in use for rotating the drum 4 in its normal or "forward" direction comprises a number of mutually parallel sub-branches. One of these sub-branches contains a main metering orifice 7 in series with a normally open valve 19, while another permanently open sub-branch contains an auxiliary metering orifice 27 of smaller effective area; a third sub-branch contains a bypass valve 5 loaded by a spring 14 which normally holds the valve 5 closed but allows it to open to pass any excess flow from the pump 2 to the motor 3 when the pressure drop produced by the flow in the two sub-branches respectively containing metering valves 7 and 27 reaches a predetermined maximum. When the pump operates to rotate the mixture drum 4 in the normal direction, flow will be distributed between the metering orifices 7 and 27, and the resultant pressure difference is applied, in opposition to a spring 13, to a piston 10 slidable in a cylinder 9 and coupled, by a linkage 11, to the element 12 determining the delivery of the pump 2, so that the action of the pressure difference tends to reduce the pump delivery. Thus, since an increase in the pressure difference corresponds to an increased flow through the metering orifices 7 and 27 and thus to an increase in the sped of the drum 4, the device will compensate for an increase in engine speed by reducing the volumetric displacement of the pump 2. The spring 14 of the relief valve 5 is set above the pressure difference necessary for the metering orifices to give the required flow to the motor. The spring 13 opposing the reduction of the displacement volume of pump 2 is so chosen that a small increase in flow thorugh orifices 7 and 27, and thus a correspondingly small increase in the speed of the drum 4, is sufficient to move element 12 from its normal position corresponding to maximum displacement of the pump to near the point of no displacement, thus ensuring that even at maximum speed of the engine the rate of rotation of the mixer drum does not rise appreciably above the desired value of about 5 r.p.m. During the actual mixing the drum 4 is required to be rotated at a considerably higher speed, for example 15 to 20 r.p.m., and at such speeds substantially the whole output of the engine is employed for rotating the drum. This operation is made possible by a short-circuit line 17 which interconnects the two ends of the cylinder 9 and is controlled by a manually operable valve 15, which in its illustrated normal position blocks the short-circuit line 17, but which can be moved against the action of a spring 16 to an open position in which a short-circuit is established; a restrictor 30 is in interposed between the joint inlets of the metering orifices 7 and 27 as well as of the relief valve 5, and the high-pressure connection of cylinder 9 to the bypass line 17. Thus when the valve 15 is open, line 17 due to the provision of the restrictor 30 relieves the piston 10 from any appreciable force opposing the spring 13, so that spring 13 will maintain the pump 2 at its maximum-displacement position. The piston 10 is also rendered inoperative when, in order to rotate the drum 4 in the reverse direction, the direction of delivery of pump 2 is reversed by means of member 8, since in this case the flow passages via the non-return valve 6 the spring pressure of which is only high enough to hold the valve closed at zero flow.

To facilitate gear-changing operations during transport of the drum, it is desirable to eliminate as far as possible any interference due to the power requirement for driving the drum 4. Therefore, according to a feature of the invention, means are preferably provided which automatically reduce or cut out the drive of the drum during such gear-changing operations. These means are controlled by the clutch-operating mechanism and are arranged to remain operative for a predetermined or preset period after each re-engagement of the clutch in order to facilitate acceleration of the engine. This is achieved by the provision of a valve 21 which is coupled to the clutch pedal 18 by a linkage 44, and on which upon operation of the clutch pedal 18 causes a servo pump 22 to charge a spring-loaded accumulator cylinder 23, the piston of which, at partial stroke will close a valve 19, in series with the main metering orifice, thus rendering the main metering orifice 7 inoperative leaving only the small auxiliary orifice 27 in circuit. This will reduce the amount of flow required to generate any given pressure for operation of the piston 10, and will thus reduce the output from the pump 2 accordingly. After gear changing is complete and the operator has released the clutch pedal 18, the return of the clutch pedal will move the valve 21 to its normal position, in which the cylinder 23 is connected to tank via a restrictor 29. The piston 24 will therefore return slowly under action of the accumulator spring 25 until the valve 19 is once more open to restore the main metering orifice 7 into circuit thus restoring the control speed to its original level. This device gives a desirable time delay between the end of the gear-changing operation and full transport rotation of the drum.

In FIGURES 2 to 7 the same reference numerals as in FIGURE 1 have been employed for corresponding parts as far as possible, and these figures will therefore be readily understood in general from the preceding description.

Figure 2:
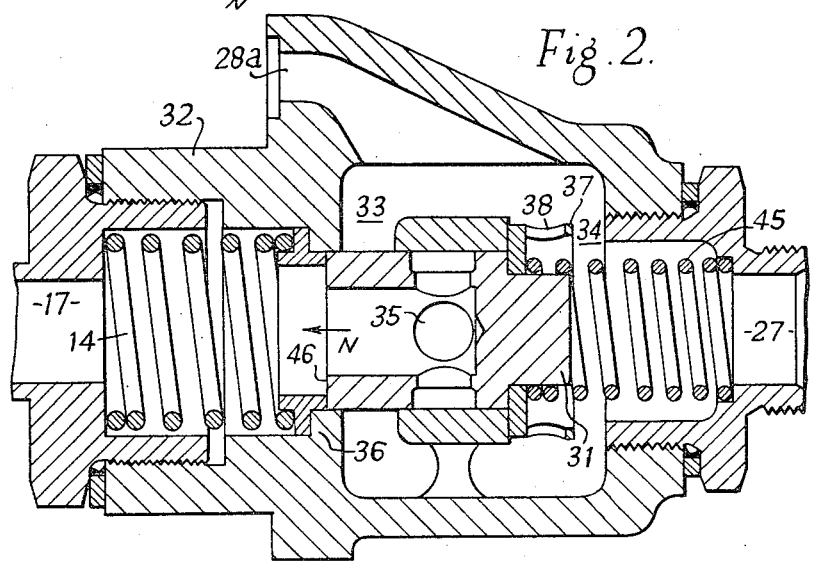
FIGURE 2 is a sectional elevation of a flow-control valve assembly.
Figure 3:
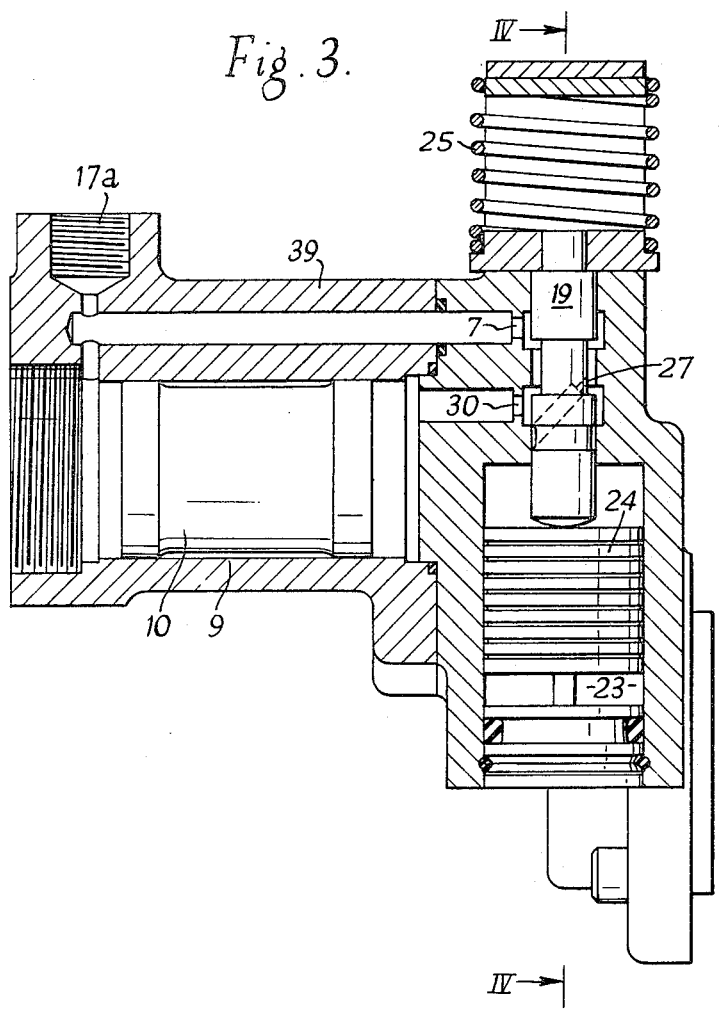
FIGURE 3 is a sectional elevation showng an assembly comprising the control cylinder, the servo cylinder, and the servo-operated valve.
Figure 4:
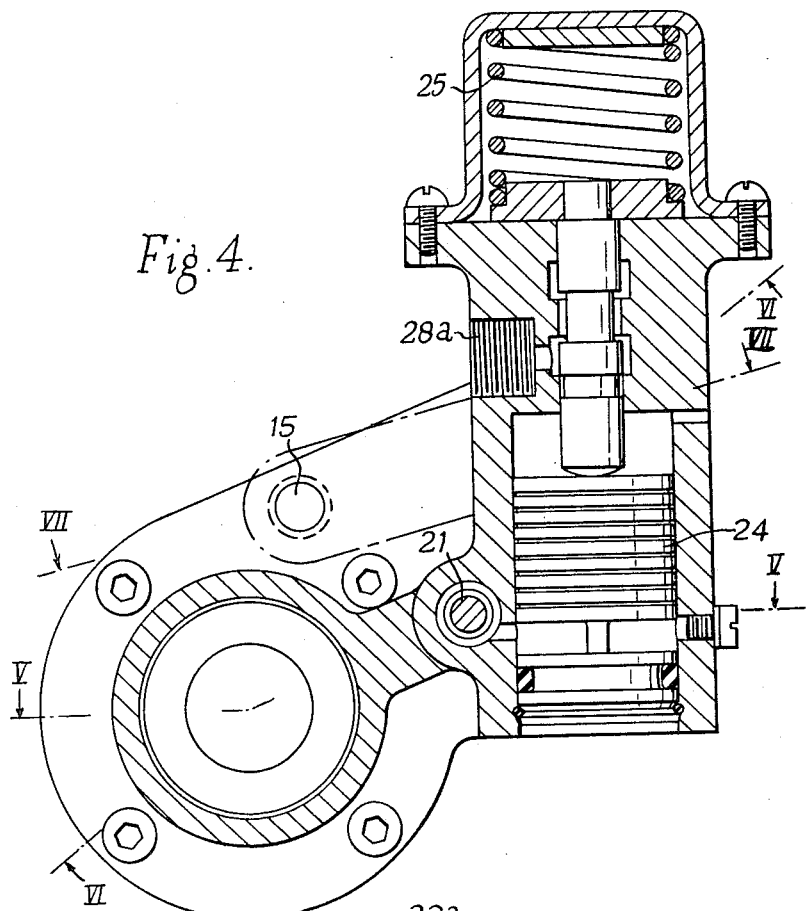
FIGURE 4 is a section on line IV—IV of FIGURE 3.
Figure 5:
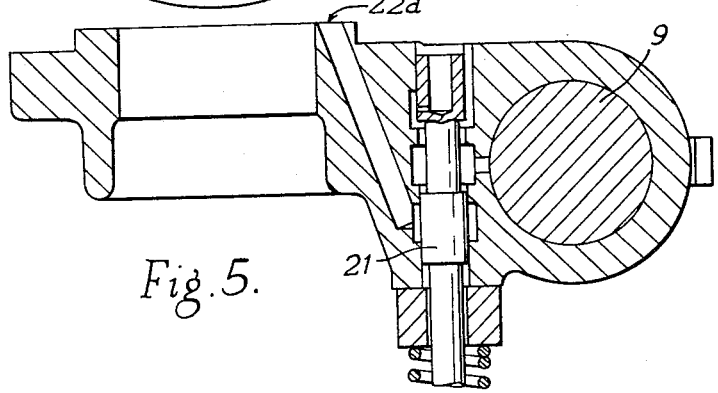
FIGURE 5 is a part-section on line V—V of FIGURE 4.
Figure 6:
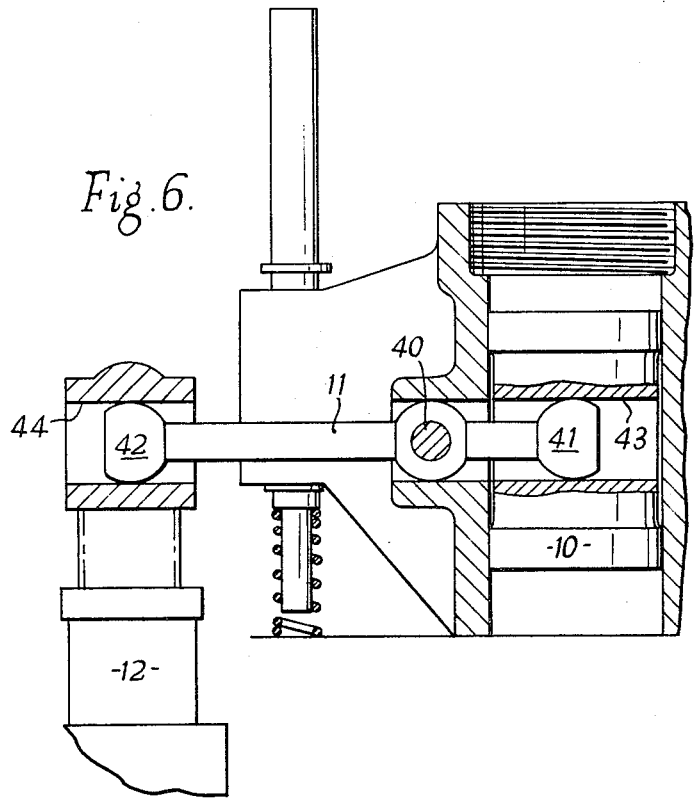
FIGURE 6 is a part-section on line VI—VI of FIGURE 4.
Figure 7:
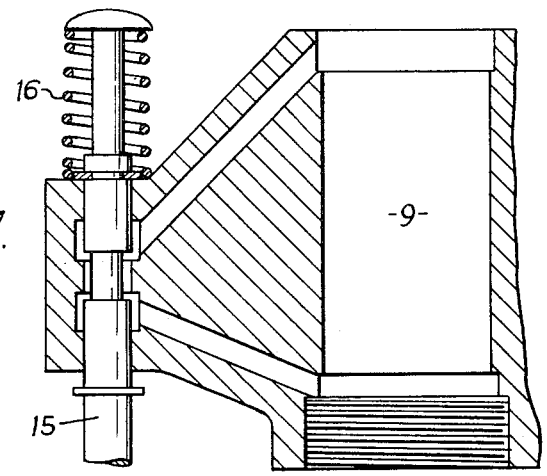
FIGURE 7 is a part-section on line VII—VII of FIGURE 4.

The delivery of pump 2 is admitted to the housing of the control arrangement shown in FIGURE 2 through inlet 27. The relief valve element 5 and the non-return valve element 6 are combined to form a spool 31 sliding in a valve housing 32 provided with two axially spaced ports 33 and 34, and the spool has a socket bore leading to ports 35 in the spool body, which in the illustrated neutral position of the spool are situated between the ports 33 and 34 and are thus blanked off by the body 32. When liquid flows from the pump to the motor, in the direction of the arrow N, the spool 31 is initially held in the illustrated position by the spring 14 which acts on a flange member 36 of the spool 31, with the flange member 36 normally resting against a shoulder of the body 32. The action of the flow will tend to displace the spool 31 in the direction N, thereby opening the ports 35, but will not be able to do so unless the pressure at inlet 27 exceeds that at outlet side 17 sufficiently to overcome the loading of spring 14.

If the pump operates in the opposite direction to produce reverse rotation of the drum 4, the flow will displace the valve spool 31 in the direction of the arrow N against the action of a light spring 45, opening the valve at the edge 46 some restriction of the opening is obtained by a collar 37 abutting against the housing 32, thus forcing the oil to pass through ports 38.

While the downstream connection to cylinder 9 is effected direct from line 17 as illustrated in FIGURE 1, the upstream connection is conveniently taken from a branch 28a, to which the line 28 containing restrictor 30 is connected.

Referring now to FIGURES 3 to 7, it will be seen that the cylinders 9 and 23 together with the valves 15 and 19 are formed in a common housing member 39 with the axes of the two pistons arranged at 90° to each other. The valve 19 is a slide valve, and the link element 11 is pivoted at 40 in the housing of the cylinder 9 and has two heads 41 and 42 which can pivot and slide in suitable bores 43 and 44 of the piston 10 and pump control member 12 respectively. The valves 15 and 21 are likewise constructed as slide valves each with its axis extending parallel to the axis of cylinder 9. It will be appreciated that while pump 22 has been symbolically indicated as a gear pump, it will, if it is a positive-displacement pump, have to be supplemented by a relief valve if the circuit is as illustrated in FIGURE 1 or alternatively, as assumed in FIGURE 4, the pump 22 may be a hydrodynamic pump, in order to enable it to run without normally having an outlet.

While one particular embodiment of the invention has been described with reference to the accompanying drawing, it will be obvious to those skilled in the art that the invention is not limited to all the details of this embodiment. Thus while the variable-displacement pump has been diagrammatically illustrated as a sliding-vane pump, a swash-plate pump may alternatively be employed, and while the adjustment of the pump displacement is described as effected by a piston directly operated by the pressure drop in the restrictor 7, this pressure drop may alternatively be used to operate a pilot valve controlling a servo system for varying the pump delivery. The restrictor 7 may, if desired, be adjustable.

What we claim is:

1. In an automotive concrete mixer having a traction engine, road wheels, means, including a normally engaged clutch, for transmitting driving power from the engine to the road wheels, a clutch pedal operable to disengage said clutch, a rotatable concrete-mixer drum, and means for transmitting rotation from the engine to the drum; the combination comprising a variable displacement pump, driven by the engine, a fixed-displacement hydraulic motor drivingly connected with the drum, a hydraulic circuit for passing the hydraulic liquid delivered by a pump to the motor and return it from the motor to the pump, means for varying the displacement of said pump from a positive maximum to a negative maximum, said circuit including a line through which normally at least the greater part of the liquid displaced by the pump moves from the pump to the motor, said line including a restrictor, a hydraulic servomotor, operable by the pressure drop in said restrictor against spring action, when the delivery of said pump is positive, to reduce said delivery, and a normally open cut-off valve connected in series with said restrictor, and means at least operatively connecting said valve with said clutch pedal to close the valve when the clutch pedal is actuated to disengage the clutch and to open the valve upon restoration of the clutch pedal to its normal position.

2. Apparatus as claimed in claim 1, wherein said operative connection between said valve and clutch pedal includes time-delay means operative to delay the return of the valve to its open position after the restoration of the clutch pedal to its normal position.

3. Apparatus as claimed in claim 1, wherein said operative connection between said valve and said clutch pedal includes a spring-loaded servo-cylinder connected to said valve and operative, upon admission of pressure fluid, to move the valve from its normal position to the closed position, and spring means biasing the valve and servo motor to the valve-open position, a source of servo pressure, a restricted bleed line leading to a point of low pressure, and a change-over valve, coupled with the clutch pedal in such manner as to normally connect the servo-cylinder with said bleed line and to substitute a connection between the servo cylinder to the source of servo-pressure when the clutch pedal is operated to disengage the clutch.

4. Apparatus as claimed in claim 1, further comprising manually operable means for setting the pump at maximum negative delivery irrespective of the position of said servo rotor.

5. Apparatus as claimed in claim 1, further comprising a by-pass line short-circuiting the servomotor, said by-pass line containing a normally closed cut-off valve, spring means for normally maintaining said last mentioned valve in the cut-off position, and manually operable means for moving the last mentioned valve to the open position to cause high-speed rotation of the drum.

6. Apparatus as claimed in claim 1 including a by-pass line short-circuiting said restrictor and cut off valve and equipped with a non-return valve preventing flow through said by-pass line in the direction from the pump to the motor.

7. Apparatus as claimed in claim 1 including a relief line short-circuiting the restrictor and cut-off valve and including a spring loaded relief valve spring-urged to prevent flow in the direction from the pump to the motor until the delivery pressure of the pump exceeds the pressure at the inlet to the motor by a predetermined minimum.

References Cited by the Examiner
UNITED STATES PATENTS

| | | | |
|---|---|---|---|
| 2,472,477 | 6/49 | Harrington et al. | 60—52 |
| 2,600,632 | 6/52 | French | 60—52 X |
| 2,729,435 | 1/56 | Harbers et al. | 60—19 X |

JULIUS E. WEST, *Primary Examiner.*

EDGAR W. GEOGHEGAN, *Examiner.*